P. E. MALMSTROM.
FILTER.
APPLICATION FILED JULY 23, 1912.
1,078,366.
Patented Nov. 11, 1913.
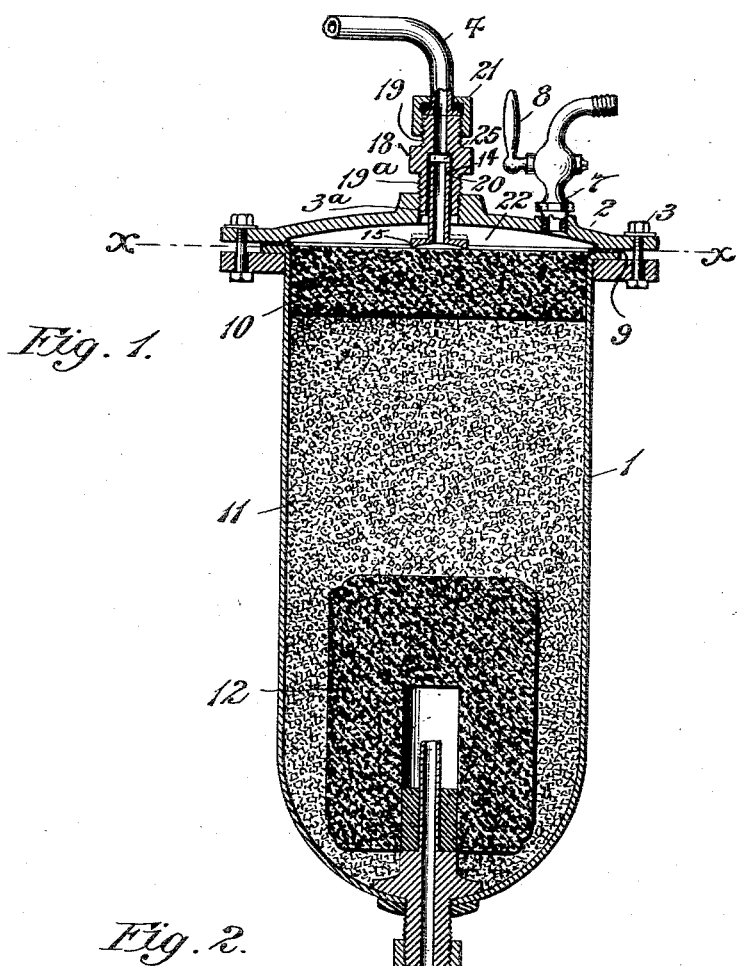
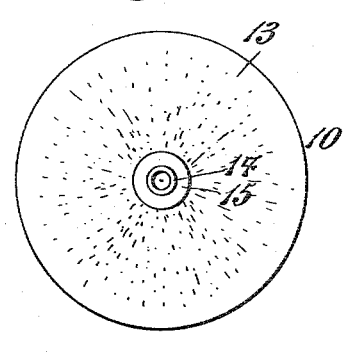
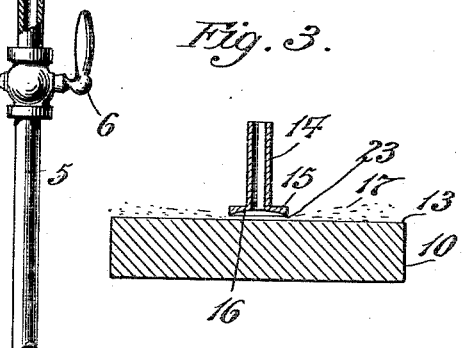
Witnesses:
Edward Rowland
Charles D. Edwards
Inventor
Peter E. Malmstrom
By his Attorneys

UNITED STATES PATENT OFFICE.

PETER E. MALMSTROM, OF NEW YORK, N. Y.

FILTER.

1,078,366.

Specification of Letters Patent.

Patented Nov. 11, 1913.

Application filed July 23, 1912. Serial No. 711,043.

*To all whom it may concern:*

Be it known that I, PETER E. MALMSTROM, a citizen of the United States of America, residing in the borough of Manhattan, city, county, and State of New York, have invented certain new and useful Improvements in Filters, of which the following is a specification.

My invention relates to the method and apparatus for supplying liquid to a filter in a way to wash the filter bed free of solid particles which lodge on its surface in the operation of filtration. It is particularly applicable to that type of filters wherein the liquid is received in an ante-chamber one wall of which is the filter bed and wherein means are provided to exhaust the contents of said chamber to cleanse the filter.

One of the difficulties encountered in such filters is that the surface of the filter bed becomes coated and impregnated with foreign material deposited thereon as the filtering operation proceeds necessitating frequent cleansing. To accomplish such cleansing, means have been provided to wash out this ante-chamber by exhausting therefrom through a course of less resistance than that of the filter. I have observed, however, that such devices are inadequate in that while the fluid contents of the ante-chamber is removed and with it such foreign matter as is in suspension in the fluid, the surface of the filter bed is not affected thereby in that the foreign matter which has coated and impregnated the filter bed adheres thereto with such tenacity as to resist the ordinary flow of fluid through the ante-chamber in the effort to cleanse the same as stated.

I have observed that the coating and impregnating of the surface of the filter bed is due to the fact that foreign matter is permitted to settle and accumulate thereon and I have discovered that this settling and accumulation of foreign matter on said surface can be prevented by so directing the flow of the fluid to be filtered as to cause the same to be forcibly delivered or projected at an angle to said surface of the filter bed and adjacent thereto so as to constantly sweep said surface with the fluid thus delivered under pressure. Under such conditions foreign particles which are carried to the surface of the filter are swept from said surface before they can obtain lodgment thereon; hence, the entire contents of the ante-chamber is kept in a state of agitation with the particles of foreign matter in suspension, and the surface of the filter bed is kept free of deposit and when the exhaust from the ante-chamber is opened, the entire contents will be expelled therefrom and the fluid thus introduced at an angle to the surface of the bed will wash off said surface as stated.

I have illustrated one embodiment of my invention in the accompanying drawings designating the parts by numerals and referring to like parts by like numerals.

Figure 1 is a vertical section of a filter. Fig. 2 is a horizontal section taken on the line *x—x*. Fig. 3 is a detail in a vertical section.

The filter bed is contained in a casing 1, closed at the top by a dome 2, secured to the casing by the bolts 3. 3ª is an aperture in said dome.

4 is a supply pipe, while 5 is an exhaust through the filter bed.

6 is a valve in the pipe 5.

7 is an exhaust pipe from the top of the filter, (*i. e.* chamber 22), and 8 a valve therein.

9 is a washer interposed between the dome 2 and casing 1.

10 is a disk of filtering material, preferably block carbon, 11 a filler preferably of bone carbon and 12 a block of cork or carbon with a chamber in the center thereof in communication with the exhaust pipe 5.

13 is the surface of the carbon disk 10.

14 is a tubular member having an annular flange 15 at the delivery end thereof at right angles to the axis of said tubular member. The underside of said flange and tube are of concave form as at 16. The dotted lines 17 are intended to illustrate the flow of the fluid in a direction radial to the axis of the tube 14.

18 is a dual joint screw threaded at each end 19—19ª and having a central aperture 20.

21 is a joint with suitable packing to secure the pipe 4 to the joint 18.

The member 14 is mounted in the aperture 20 and suitably packed and the screw thread 19ª is screwed into an aperture 3ª in the dome 2 at the center thereof. The flange 15 of the member 14 is mounted adjacent to the surface 13 of the carbon plate 10 and its position with reference thereto may be adjusted by rotating the joint 18, so as to work the screw 19ª into or out of the aperture 3ª.

22 is a chamber formed between the dome 2 and the carbon plate 10, one wall of which is the surface of the filter bed.

The operation of my device is as follows: The fluid to be filtered is supplied under pressure through the pipe 4 and tube 14, and as the tube 14 with its flange 15 is mounted adjacent to the surface 13 of the plate 10, the fluid is forced into the space formed by the surface 13 and the concavity 16, thence it will take the course of least resistance which is in a direction radial to the axis of the tube 14 and at an angle to the surface 13 of the plate 10 as illustrated at 17 in a way to sweep said surface by the force of the projection of the fluid, thus dislodging any particles of foreign matter that may have accumulated on said surface and thus keeping said particles of foreign matter constantly in suspension within the chamber 22. As stated, I may adjust the member 14 in its relation to the surface 13, so as to make the annular aperture 23 between the flange 15 and the surface 13 more or less confined, hence increasing or diminishing the force of the flow of fluid. The concave form 16 of the underside of the flange 15 has a tendency to direct the flow of the fluid at an angle to the surface 13, thus causing the flow to impinge on said surface with a direct sweeping action. I may interpose an elastic means between the top of the member 14 and the top of the chamber 20, such as the elastic washer 25, which will normally hold the flange 15 in contact with the surface 13, but when fluid pressure is introduced, such pressure will be sufficient to retract said member 14 against the elasticity of said washer 25 sufficient to permit the flow of the fluid between the flange 15 and the surface 13.

When it is desired to clean the filter, the valve 8 is opened and as the port 7 offers the course of least resistance, the filter bed offering a greater resistance, the contents of the chamber 22 will be exhausted through said port 7, the fluid still in its flow sweeping the surface of the plate 10 will wash off all impurities which may have lodged thereon and keep such in suspension until they are drawn off through the exhaust as stated. When this cleansing process is completed, the valve 8 is closed and the filtering operation continues as before.

What I claim is:

A filter consisting of a container, a porous body of filtering material, means for leading liquid to be filtered into the container, a nozzle to which the liquid is supplied, the nozzle having an expanded outlet adjacent the surface of the filtering material and means supporting the nozzle so that it can move toward and from the filtering material, resilient means tending to maintain the nozzle outlet immediately adjacent the surface of the filtering material whereby the liquid to be filtered is caused to flow in a film over the surface of the filtering material and clean the surface, the pressure of the resilient member serving to regulate the flow and tending to maintain the velocity of flow constant as the supply varies.

Signed by me at New York city, county and State of New York, this 10th day of July, 1912.

PETER E. MALMSTROM.

Witnesses:
CHARLES D. EDWARDS,
THOS. C. HILL.